United States Patent [19]

Mizukami

[11] Patent Number: 5,309,567
[45] Date of Patent: May 3, 1994

[54] STRUCTURE AND METHOD FOR AN ASYNCHRONOUS COMMUNICATION PROTOCOL BETWEEN MASTER AND SLAVE PROCESSORS

[75] Inventor: Toshiaki Mizukami, Cupertino, Calif.

[73] Assignee: C-Cube Microsystems, Milpitas, Calif.

[21] Appl. No.: 826,327

[22] Filed: Jan. 24, 1992

[51] Int. Cl.⁵ .................. G06F 15/16; G06F 13/00
[52] U.S. Cl. .................. 395/325; 395/200; 364/230; 364/230.4; 364/260; 364/240.8; 364/240.9; 364/DIG. 1
[58] Field of Search .............. 395/325, 200, 275, 425, 395/725; 340/825.06, 825.52; 371/33; 370/85.1

[56] References Cited

U.S. PATENT DOCUMENTS

| | | | |
|---|---|---|---|
| 4,393,501 | 7/1983 | Kellogg et al. | 371/33 |
| 4,443,850 | 4/1984 | Harris | 364/200 |
| 4,547,849 | 10/1985 | Louie et al. | 364/200 |
| 4,646,300 | 2/1987 | Goodman et al. | 371/33 |
| 4,972,368 | 11/1990 | O'Brien et al. | 364/900 |
| 5,023,778 | 6/1991 | Simon, Jr. et al. | 364/200 |
| 5,072,369 | 12/1991 | Theus et al. | 395/425 |
| 5,113,990 | 5/1992 | Gabrius et al. | 194/206 |
| 5,185,853 | 2/1993 | Cheng et al. | 395/115 |

*Primary Examiner*—Gopal C. Ray
*Attorney, Agent, or Firm*—Skjerven, Morrill, MacPherson, Franklin & Friel

[57] ABSTRACT

In accordance with the present invention, a structure and a method for asynchronously interfacing a master processor and a slave processor is provided by receiving from and providing to the master device control signals of a polling protocol, and receiving from and providing to the slave device control signals of an interrupt type protocol. In a first embodiment of this invention, the master processor provides WR (write request), RD (read request), OE (output enable) signals, and receives a BUSY (busy) signal. The slave processor receives an "int" (interrupt) signal, and provides "intack" (interrupt acknowledge), "outs" (output), and "ins" (input) signals. In a second embodiment of this invention, instead of the RD signal of the first embodiment, the read request signal is the AND product of an AS (address strobe) signal and the most significant bit of the read address.

14 Claims, 9 Drawing Sheets

BUS SYSTEM

KEY TO FIG. 3 | FIG. 3A | FIG. 3B

KEY TO FIG. 4

| FIG. 4A |
| FIG. 4B | data transfer from master to slave

FIG. 5A data transfer from master to slave

FIG. 5B data transfer from master to slave

FIG. 5C data transfer from slave to master

FIG. 5D

STRUCTURE AND METHOD FOR AN ASYNCHRONOUS COMMUNICATION PROTOCOL BETWEEN MASTER AND SLAVE PROCESSORS

FIELD OF THE INVENTION

This invention relates to the design of a system of communicating computers. In particular, this invention relates to the design of communication protocols between devices of a computer system.

DESCRIPTION OF RELATED ART

In a computer system involving multiple communicating processors, synchronization of bus timing between communicating processors is necessary for successful data transfer from one processor to another. A discussion of various schemes for bus timing synchronization generally known in the art can be found in "Computer Architecture and Organization" by John Hayes, second edition, pp. 475-84.

One class of protocols, called "polling", is widely used in memory systems. Polling involves a master device controlling the bus transactions, and issuing "read" and "write" requests to a slave device. A bus transaction is completed when the slave device provides a "data ready" signal, which is also sometimes called the "busy" signal. This system requires the slave device to poll the master device regularly for read and write requests. However, if the read and write requests are not issued with regularity, polling is wasteful of the slave device's resources. Because of the simple signalling convention, this system is suitable when the slave device is a dedicated resource, such as a primary memory system, in which the overhead incurred in polling cannot be otherwise put to productive use.

Another widely used class of protocols is the "interrupt" system. Under the interrupt system, the slave processor executes an interrupt service routine only when a service request from the master processor is detected. The detection of whether an interrupt is raised is performed at a very low level, typically between instructions in the current context of the slave processor, so that the overhead for detecting a service request is minimum. Only after an interrupt is detected and accepted is the overhead of a context switch and of servicing the master device incurred. Because the master device must wait for the slave device to "acknowledge" the interrupt (i.e. the slave device shows acceptance of the interrupt by issuing an interrupt acknowledge signal) before the bus transaction can proceed, the interrupt system is particularly efficient if the slave processor is a much "faster" processor than the master device. For example, this system is useful as between a printer, as a master device, and a central processing unit (CPU), as the slave device.

The "interrupt" type protocol is also very versatile because the scope of the services provided by the slave processor can exceed simple read and write operations raised on dedicated bus lines. Typically, the master processor specifies in an "interrupt vector" the service requested of the slave processor. Many variations of requested service are therefore possible.

However, when the master and slave devices are general purpose processors of comparable performance, neither these schemes or other schemes in the prior art provides satisfactory performance.

SUMMARY OF THE INVENTION

In accordance with the present invention, a bus interface unit mediates communication between a slave processor and a master processor. The master processor, which controls data transfer to and from the slave processor, provides and receives control signals which assume "polling" by the slave processor. The slave processor provides and receives control signals which assume "interrupt" by the master processor. The bus interface unit provides protocol translation between the control signals of the master and slave processors.

In one embodiment, a bus interface unit of the present invention is provided between two computers, one of which is designated the master processor and the other is designated the slave processor. In this embodiment, only the computer designated the master processor can initiate data transfer.

In another embodiment, two bus interface units of the present invention are provided between two computers. In this embodiment, either computer can initiate a data transfer. The computer which initiates the data transfer is designated the master processor with respect to that transfer.

The bus interface unit provides the benefits of the simplicity of the "polling" type protocol, and both versatility and efficiency of the "interrupt" type protocol. Beside providing protocol translation between two otherwise incompatible protocols, the present invention achieves high efficiency for communication between two computers of comparable performances.

BRIEF DESCRIPTION OF THE DRAWINGS

FIG. 5A is a timing diagram showing the control signal transitions in a data transfer from the master processor to the slave processor. In FIG. 5a, the "busy" signal is reset when the write request signal is issued by the master processor.

FIG. 5B is a timing diagram showing the control signal transitions in a data transfer from the master processor to the slave processor. In FIG. 5b, the "busy" signal is set when the write request signal is issued by the master processor.

FIG. 5C is a timing diagram showing the control signal transitions in a data transfer from the slave processor to the master processor. In FIG. 5c, the "busy" signal is reset when the read request signal is issued by the master processor.

FIG. 5D is a timing diagram showing the control signal transitions in a data transfer from the slave processor to the master processor. In FIG. 5d, the "busy" signal is set when the read request is issued by the master processor.

DETAILED DESCRIPTION

Figure 1:
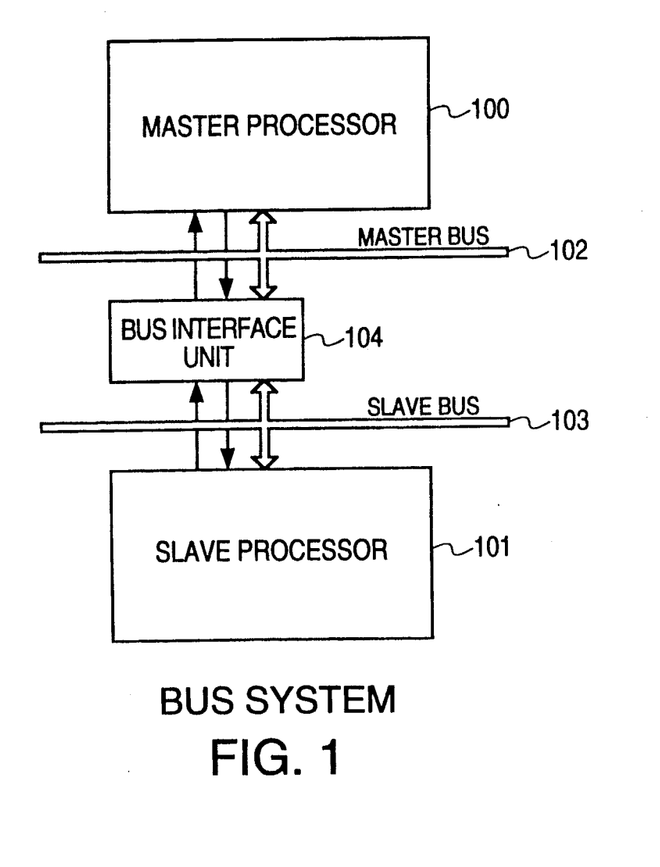
FIG. 1 shows a system in which a bus interface unit, in accordance with the present invention, provides a communication protocol between a master and a slave processor.

FIG. 1 shows a system in which a bus interface unit 104 in accordance with the present invention is interposed between a master processor 100 and slave processor 101 to provide a communication protocol between these processors.

In this system, the master processor 100 controls data transfer using a polling protocol. In this polling protocol, from the master processor 100's perspective, the slave processor 101 polls the master processor 100 for read and write requests and signals completion of a bus transaction by the high-to-low transition of a "busy" signal. Under this scheme, the master processor 100 treats the slave processor 101 as a peripheral device. However, from the slave processor 101's perspective, the slave processor 101 uses an interrupt protocol in which the slave processor 101 services a data transfer request only when it receives an interrupt signal from the master processor 100. Hence, the bus interface unit 104 provides a protocol translation from the master processor 100's polling protocol to the slave processor 101's interrupt protocol, and vice versa. The master processor 100 reads and writes data over the master bus 102, whereas the slave processor 101 reads and writes data over the slave bus 103.

Figure 2:
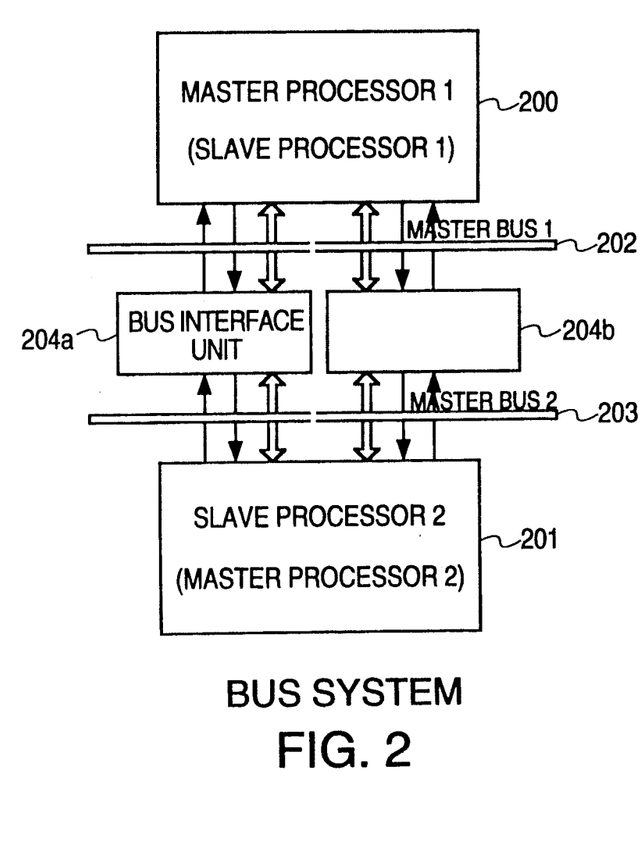
FIG. 2 shows a system in which two bus interface units, in accordance with the present invention, provide communication protocols between two processors.

FIG. 2 shows a system in which two bus interface units 204a and 204b in accordance with the present invention are interposed between two processors 200 and 201 to provide communication protocols between these processors. Unlike the system shown in FIG. 1, where one processor is designated the master device and the other is designated the slave device, both processors 200 and 201 are master and slave devices. This is because processors 200 and 201 each, with respective to data transfer it initiates, act as the master device. Conversely, with respect to interrupts received, each of processors 200 and 201 acts as the slave device. Hence, in this configuration, the designation of "master" and "slave" depends on which processor initiates (and therefore, controls) the data transfer. As in the system shown in FIG. 1, the master device uses a polling protocol, and the slave device uses an interrupt protocol. Processor 200 reads and writes data over bus 202, and processor 201 reads and writes data over bus 203.

Figure 3A:
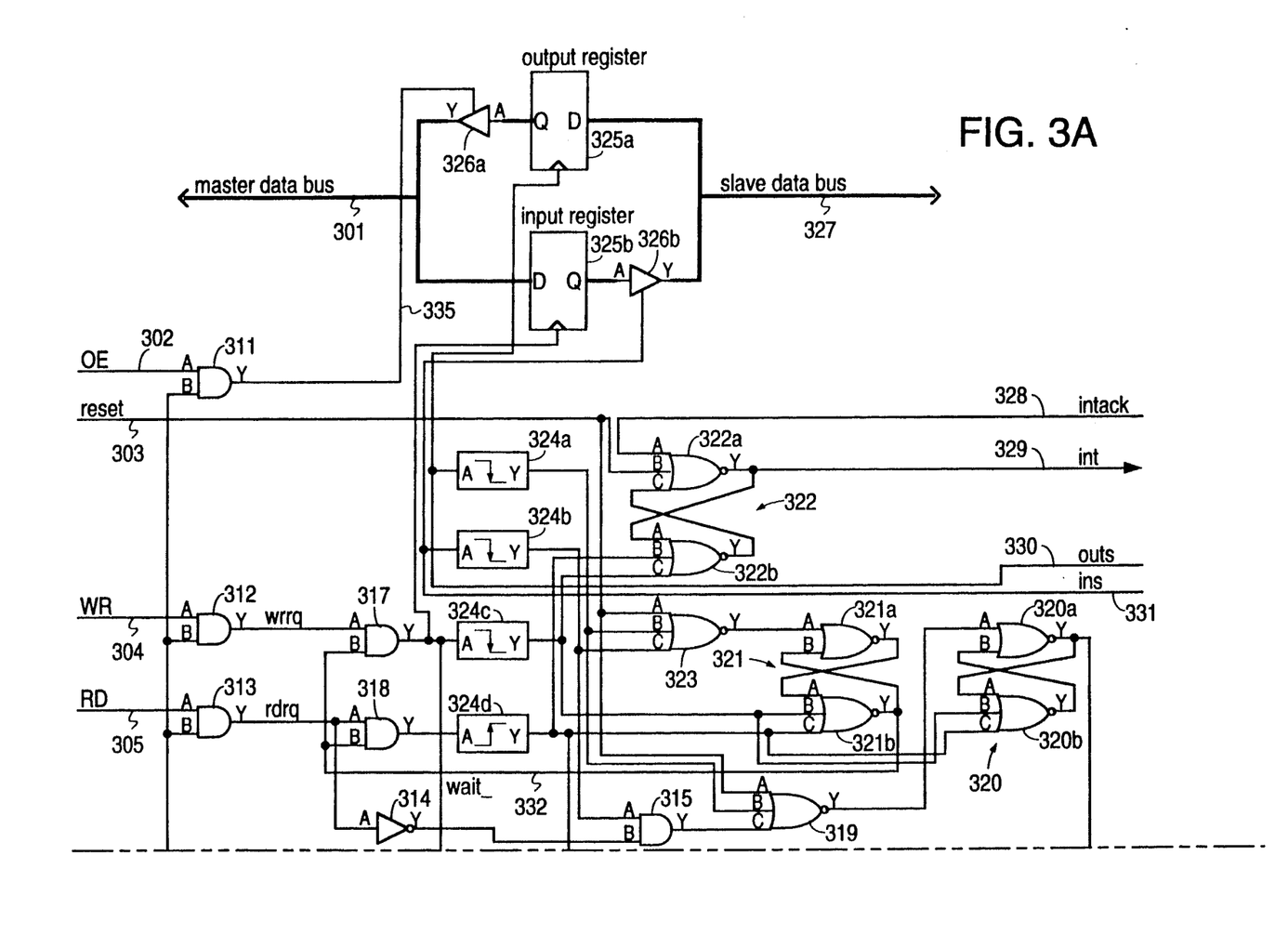
FIGS. 3A and 3B show a first embodiment of a bus interface unit in accordance with the present invention.
Figure 3B:
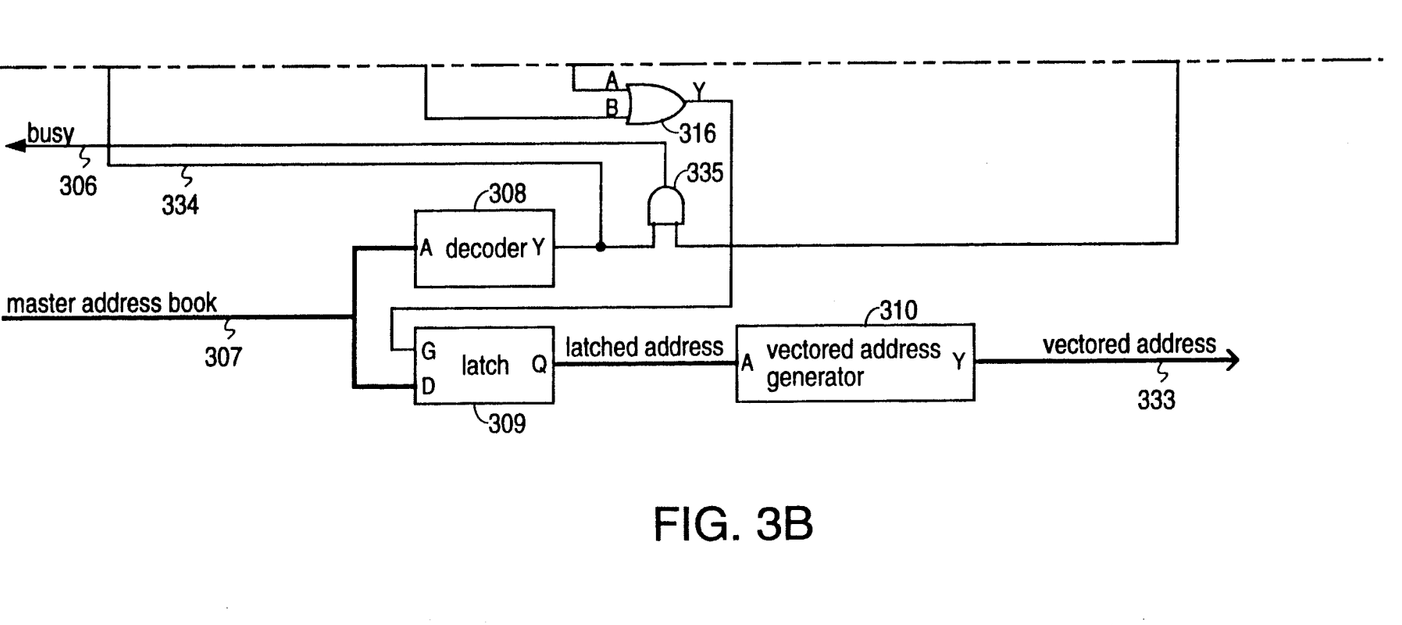

FIG. 3 shows a first embodiment of a bus interface unit in accordance with the present invention. This bus interface unit is suitable for use as the bus interface unit 104 of FIG. 1 and as either bus interface unit 204a or 204b of FIG. 2. As shown in FIG. 3, the control signals provided by the master processor are the WR ("write enable" or "write request") signal on lead 304, RD ("read enable" or "read request") on lead 305, OE ("output enable") on lead 302, and "reset" signal on lead 303. The master processor receives as control signal the "busy" signal on lead 306. The master processor controls data transfer by raising either the RD signal on lead 305, or the WR signal on lead 304. At the same time, the master processor provides an address of the slave processor on master address bus 307. This address is recognized by address decoder 308, which enables AND gates 312 and 313, to provide either internal signal "wrrq" or internal signal "rdrq", corresponding respectively to either signal WR or signal RD.

The reset signal is provided on lead 303 to abort a previous read or write request. The OE ("output enable") signal on lead 302, controls the direction of master data bus 301. When OE is held at logic low, buffer 326a is at a high-impedance state, so that the data on master bus 301 is held to be read by input register 325b for transfer to the slave processor. Conversely, when the OE signal is held at logic high, the content of output register 325a is provided to the master bus 301 through enabled buffer 326a.

The slave processor receives an interrupt signal "int" on lead 329, and provides an interrupt acknowledge signal "intack" on lead 328, an output strobe signal "outs" on lead 330, and an input strobe signal "ins" on lead 331. The slave processor receives or writes data on a slave bus 327, which is isolated from the master bus 301 by the registers 325a and 325b. Register 325a and 325b are each clocked by a falling edge transition at its clock input lead. When servicing a write request from the master processor, the slave processor reads from the slave bus 327 the data which is previously strobed from master bus 301 into register 325b by the signal "wrrq." The slave processor reads this data in register 325b during the logic high state of the input strobe signal "ins" on lead 331, which enables buffer 326b to gate the output signal of register 325b onto the slave bus 327. Alternatively, when servicing a read request from the master processor, the slave processor provides the data on the master bus 301 during the logic high state of the output strobe signal "outs" on lead 330, which strobes the content of slave bus 327 into register 325a. Both the "ins" and the "outs" signals are controlled by the interrupt service routines of the slave processor. The content of register 325a is then provided to master bus 301, when the master processor provides the output enable signal "OE," which is gated by AND gate 311 as the enable signal "outputen" of buffer 326a.

This embodiment of the interface bus unit can be integrated with the slave processor on the same integrated circuit chip. The present invention can also be implemented as a separate integrated circuit, for example. In this embodiment, the master processor can be a host microcomputer, such as a Macintosh personal computer, available from Apple Computer, Cupertino, Calif. It will be appreciated that this configuration is intended to be exemplary of the present invention and not necessary. For example, other computers, including other personal computers, minicomputers or mainframes, may also be used as a host computer.

In the following description, a signal is said to set a set-reset (RS) flip-flop when a logic low-to-high transition of the signal occurs at the "set" terminal of the RS flip-flop causing the RS flip-flop's output to go to or to remain at a logic high state. Alternatively, a signal is said to reset a RS flip-flop when a logic low-to-high transition of the signal occurs at the "reset" terminal of the RS flip-flop causing the RS flip-flop to go to or to remain at a logic low state.

As shown in FIG. 3, this bus interface unit includes AND gates 311-313, 315, 317-318 and 335, OR gates 316, 319 and 323, inverter 314, decoder 308, address latch 309, vectored address generator 310, four edge detectors 324a-324d, and three set-reset (RS) flip-flops 320-322, respectively formed by NOR-gate pairs 320a-320b, 321a-321b and 322a-322b. Edge detectors 324d is a rising edge detector, and edge detectors 324a-324c are falling edge detectors. Each edge detector of edge detectors 324a-324d sends out a pulse (i.e. a logic low-to-high transition, to be followed after a predetermined delay a logic high-to-low transition) at its output lead when its input signal undergoes the designated rising or falling edge transition. For example, edge detector 324a sends a pulse when it detects in the "outs" signal a falling edge transition. Edge detector 324d, however, sends a pulse at its output lead when it detects in the signal "rdrq" a rising edge transition.

Further, edge detector 324a's pulse, assuming the output signals of OR-gates 323 and 319 are not each already in logic high state, will reset to logic low RS flip-flop 320 and set to logic high RS flip-flop 321 (hence, sets the "nowait" signal and reset the "busy" signal).

The master processor's output enable, read request and write request signals, i.e. OE, RD and WR, are each ANDed with the chip select signal provided by decoder 308 on lead 334 to form the signals "outputen", "rdrq" and "wrrq" respectively, as described above. The "busy" signal generated on lead 306 is the output signal of the RS flip-flop 320 ANDed at AND gate 335 with chip select signal of decoder 308.

As can be readily seen in FIG. 3, when the "nowait" signal on lead 332 is at logic high, a rising edge of the "rdrq" signal can be detected by edge detector 324d, which then sets by an output pulse both RS flip-flops 320 and 322, and resets RS flip-flop 321. Similarly, when the "nowait" signal is at logic high, a falling edge of the "wrrq" signal can be detected by edge detector 324c, which also sets by an output pulse both RS flip-flop 320 and 322, and resets RS flip-flop 321. The output of RS flip-flops 320, 321 and 322 are respectively the "busy" signal on lead 306 (when AND gate 335 is enabled by chip select signal of decoder 308), the "nowait" signal on lead 332, and the "int" (i.e. interrupt) signal on lead 329. When either the rising edge of the "wrrq" signal or the falling edge of the "rdrq" signal is recognized, the respective edge detector generates an interrupt at the slave processor, sets the "nowait" signal to logic low, and signals to the master processor that the slave processor is busy. As will be shown below, the master processor monitors a bus transaction through the "busy" signal. The "nowait" signal ensures that a write transaction completes before the next read or write transaction can proceed.

Each of RS flip-flops 320 and 322, set either by the "rdrq" or the "wrrq" signal, is reset by the "reset" signal on lead 303. The interrupt acknowledge "intack" signal raised on lead 328 by the slave processor resets flip-flop 322, to clear the pending "int" signal, while the interrupt is being serviced. RS flip-flop 320, i.e. the "busy" signal, is reset by one of the three conditions: a) a reset signal on lead 303, b) a falling edge is detected by edge detector 324a in the "outs" signal on lead 330, and c) a falling edge is detected by edge detector 324b in the "ins" signal on lead 328, when the "rdrq" signal is not at logic high. As will be shown by the protocols to be described below, these three conditions correspond respectively to a reset, the completion of a read request by the slave processor, and the completion of a write request by the slave processor, when no other read or write request is pending.

RS flip-flop 321, which provides the "nowait" signal when reset, is set by the "reset" signal on lead 303 and also by the falling edge of either the "outs" signal on lead 330 and the "ins" signal on lead 331. The RS flip-flop 321, and hence the "nowait" signal is reset by either the rising edge of the "rdrq" signal on the falling edge of the "wrrq" signal.

Address latch 309 latches the address made available on the master address bus 307 when a rising edge is detected in either the "rdrq" signal or the "wrrq" signal. This latched address is decoded by the vectored address generator 310, which maps the latched address to the vectored address where the routine the slave processor uses to service the interrupt is located. The vectored address is made available to the slave processor on vectored address bus 333.

FIGS. 5a-5d each shows the control signal protocol of a bus transaction implemented by the bus interface unit shown in FIG. 3. In addition to the corresponding figure of FIGS. 5a-5d, each bus transaction is also described below with reference to FIG. 3.

Figure 5A:
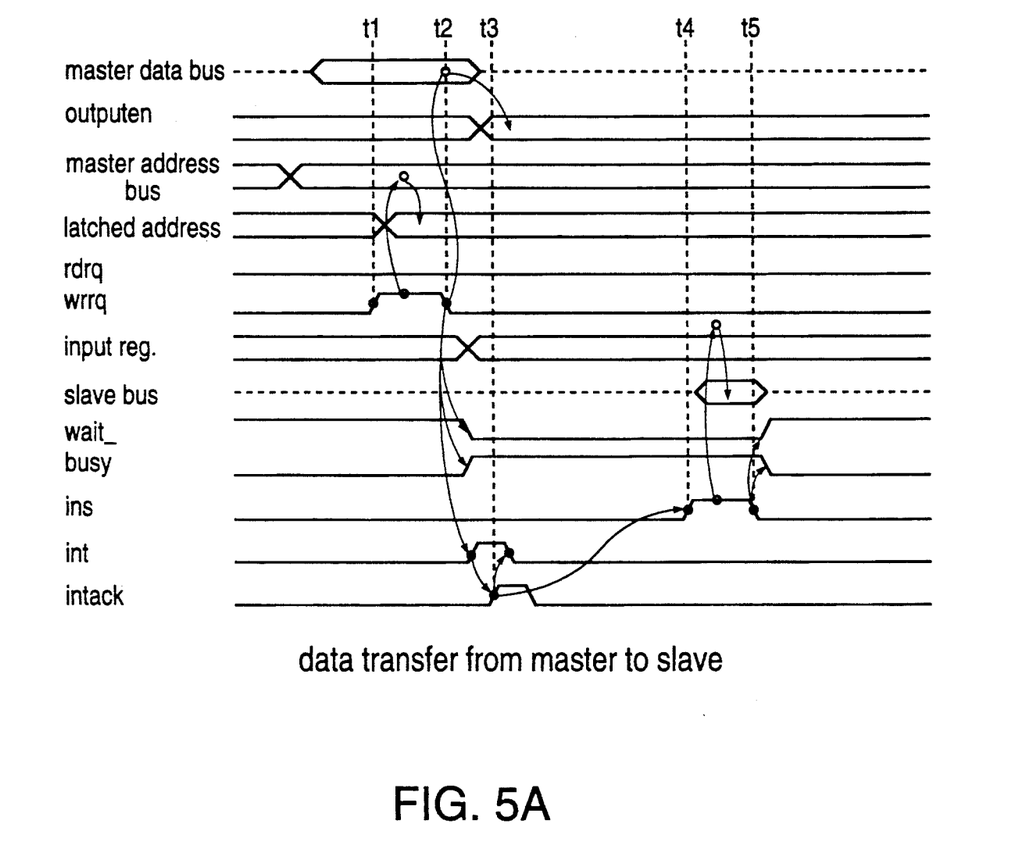

FIG. 5a shows the control signal transitions when the WR signal, i.e. a write request, is raised at time t1 by the master processor on lead 304. FIG. 5a assumes that all previous transactions have been completed or a reset signal on lead 303 is just received, so that the "busy" signal on lead 306 is at logic low, and the "nowait" signal on lead 332 is at logic high. The control signal transitions corresponding to the condition in which the WR signal is raised when the previous transaction is not completed are discussed in conjunction with FIG. 5b.

The WR signal raised at time ti propagates through AND gate 312 as the "wrrq" signal. At the same time, the master processor places on master bus 301 the data to be written, and on master address bus 307 an address of the slave processor. The address on master address bus 307 is latched by address latch 309, after some propagation delay (the "busy" signal being at logic low) through AND gate 317 and OR gate 316. Meanwhile, the signal OE is maintained at logic low to disable buffer 326a (i.e. to maintain buffer 326a's output lead at "high impedance" state), so that the output signal of register 325a is not imposed on master bus 301.

Upon the master processor dropping the WR signal at time t2, the resulting falling edge of "wrrq" signal is detected by edge detector 324c, which resets RS flip-flop 321 and sets both RS flip-flop 320 and 322. Thus, after some propagation delay, the "nowait" signal is reset and both the "busy" signal on lead 306 and the interrupt signal "int" on lead 329 are set. At the same time, the falling edge of "wrrq" signal provides the strobe signal to latch the data on master bus 301 into register 325b. From the master processor's point of view, the write bus transaction is complete at this time t2. The master processor is not required to wait for the slave processor to complete the remainder of the write bus transaction. After time t2 the master can immediately access another peripheral or data bus.

The slave processor responds to the interrupt signal "int" by raising the "intack" signal at time t3 on lead 329. The "intack" signal resets the "int" signal on lead 328 after the propagation delay of RS flip-flop 322. From the slave processor's point of view, interrupt service is initiated at time t3 when the slave processor raises the interrupt acknowledge signal "intack". After raising the interrupt acknowledge signal, the slave processor jumps to the vectored address generated by vectored address generator 310; the vectored address is the location at which the slave processor's service routine for a write request resides.

At time t4, when the slave processor is ready to receive the data to be written, the slave processor raises the signal "ins" on lead 331, which enables the buffer 326b to make available the data in register 325b onto the slave bus 327. After the slave processor has read the data from slave bus 327, the "ins" signal on lead 331 is brought back to logic low at time t5. The falling edge of the "ins" signal is detected by the edge detector 324b, which resets RS flip-flop 320 to bring signal "busy" to logic low and sets RS flip-flop 321 to bring the "nowait" signal to logic high. At this point, the bus transaction is completed from the slave processor's point of view. The falling edge of the "ins" signal at time t5 also disables the buffer 326b, thereby isolating the slave bus 324 once again from the register 325b.

Because the master processor does not wait for the slave processor's part of the bus transaction, nor is the slave processor required to respond to the interrupt immediately, each processor maintains control over its scheduling in this bus transaction.

Figure 5B:
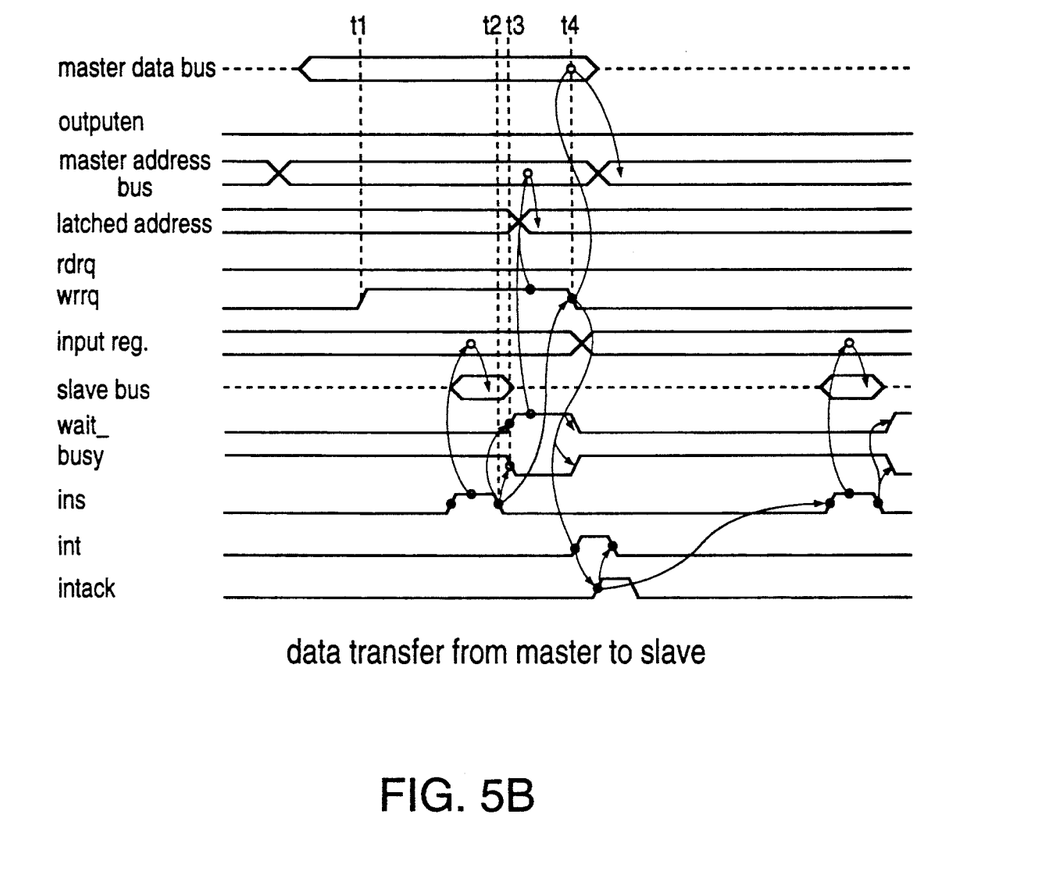

FIG. 5b shows the control signals of a "write" bus transaction, in which the master processor raises the WR signal at time t1, when the slave processor has another pending interrupt. At time t1, because of a prior bus transaction, the "busy" signal on lead 306 is held at logic high to indicate that the prior bus transaction is not completed. Note that the prior transaction is necessarily a write operation because, as will be seen below, during a read operation, the master processor cannot initiate a new transaction until the slave processor's read operation is completed. As described above, when the WR signal is raised, the master processor also places an address and data on master address bus 307 and master bus 301 respectively. Because the "nowait" signal is at logic low at time t1, the "wrrq" signal is blocked by AND gate 317, so that, unlike the situation of FIG. 5a, the master address bus on master address bus 307 is not latched by address latch 309 until after the "nowait" signal is brought to logic high again at the end of the prior transaction.

As shown in FIG. 5b, the slave processor's prior transaction was completed at time t2, when the "ins" signal is brought back to logic low to reset the "busy" signal. While the slave processor's "busy" signal remains set, the master processor must wait until the "busy" signal is reset, which occurs shortly (i.e. after some propagation delay) after the "ins" signal is reset at time t2. The master processor can drop the WR signal after the "busy" signal is reset. Upon receiving the logic low level of the signal "busy" on lead 306, the master processor terminates its wait by bringing the WR signal to logic low level at time t4, thereby completing the "write" transaction from its point of view. The signal protocol subsequent to time t3 for the remainder of this "write" request of FIG. 5b is identical to the signal protocol subsequent to time t2 of FIG. 5a, and therefore not repeated.

Figure 5C:
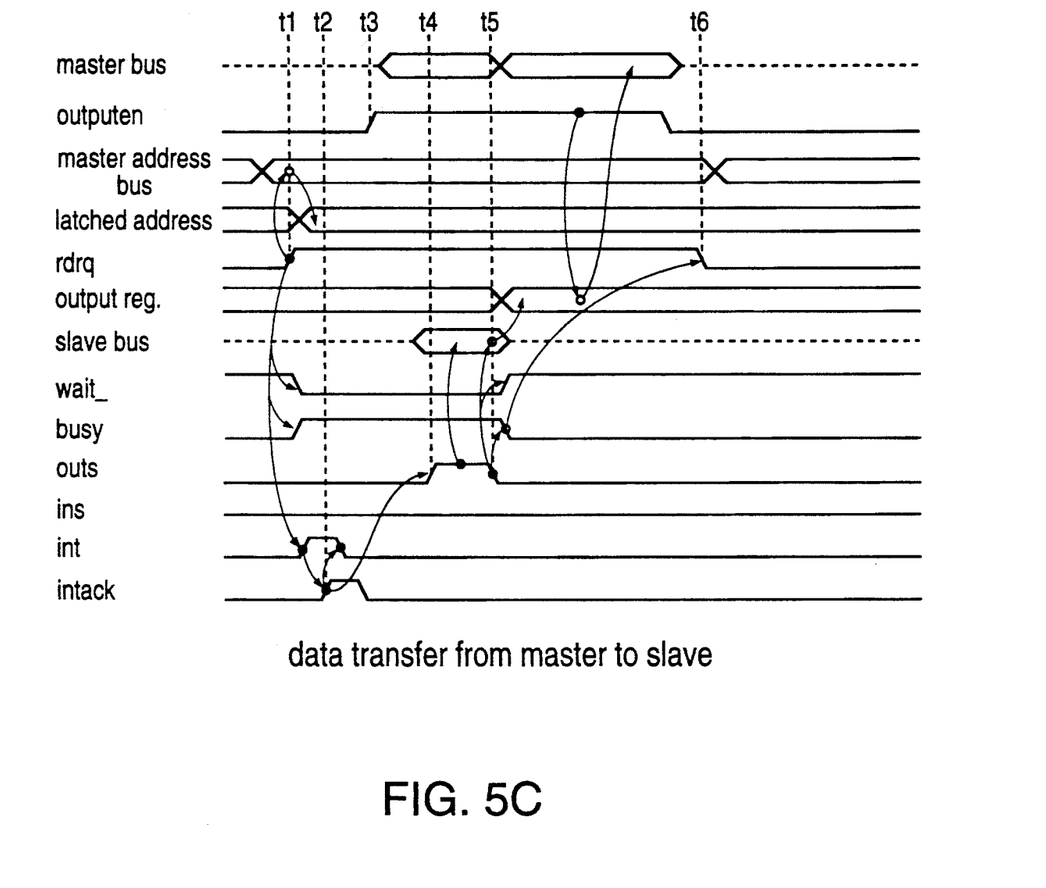

FIG. 5c shows the control signal transitions after the RD signal, i.e. a read request, is raised at time t1 by the master processor on lead 305. In FIG. 5c, the "busy" signal is at logic low at time t1. The case in which the "busy" signal is at logic high when a RD signal is raised is described below in conjunction with FIG. 5d. This signal RD propagates through AND gate 313 as the "rdrq" signal (i.e. read request). At the same time as the RD signal is raised, the master processor places an address of the slave processor on master address bus 307. Since the "nowait" signal is at logic high (no incomplete previous transaction), the rising edge of the "rdrq" signal is propagated by AND gate 318 and detected by edge detector 324d, which resets through RS flip-flop 321 the "nowait" signal and sets respectively both the "int" signal on lead 329 and the "busy" signal on lead 306 through RF flip-flops 322 and 320. This rising edge of signal "rdrq" detected by edge detector 324d is also propagated through OR gate 316 to strobe the address on master address bus 307 into address latch 309. The latched address is used by the vectored address generator 310 to generate on vectored address bus 333 a vectored address of the slave processor where the slave processor's service routine for the read request is located.

The slave processor responds to the interrupt signal "int" by raising the "intack" signal at time t2 on lead 328, which resets the "int" signal on lead 329 after the propagation delay of RS flip-flop 322. From the slave processor's point of view, the interrupt service is initiated when it raises the "intack" signal at time t2 to service of the pending interrupt.

At time t3, the OE signal is raised by the master processor. Because the function of this OE signal is to direct the output of register 325a onto the master bus 301 through buffer 326a, this OE signal can be raised any time before the master processor reads the master bus 301 for the requested data. In this embodiment, the OE signal appears a fixed time period after the RD signal is asserted, but this fixed time relationship is not necessary, since the OE signal can be asserted by the master processor any time after RD is asserted and before reading from the master bus 301. For example, the OE signal may be provided after the "busy" signal is reset at time t5 described below. In this embodiment, since the OE signal is asserted before the slave processor completes the read request, the data appearing on the master bus 301 are initially invalid.

Upon raising the "intack" signal at t2, the slave processor jumps to the vectored address provided by vector address generator 310, to begin servicing the read request. When the slave processor is ready to provide the requested data at time t4, the slave processor raises the signal "outs" on lead 330, and at the same time places the requested data onto slave bus 327. The "outs" signal is brought to logic low by the slave processor at time t5, so that its falling edge strobes the data on the slave bus 327 into output register 325a. The falling edge of the "outs" signal is detected by edge detector 324a, which sets the "nowait" signal on lead 332 and resets the "busy" signal on lead 306 via RS flip-flops 321 and 320, signalling the completion of the read bus transaction from the slave processor's point of view.

When the master processor detects that the "busy" signal on lead 306 is brought to logic low, the master processor reads the data from master bus 301 (the buffer 326a having been enabled by the OE signal since time t3). After the requested data is read, the master processor brings the RD signal to logic low at time t6, signalling the end of the read cycle for the master processor. In a read request, the master processor's transaction completes after the slave processor's transaction is completed.

Figure 5D:
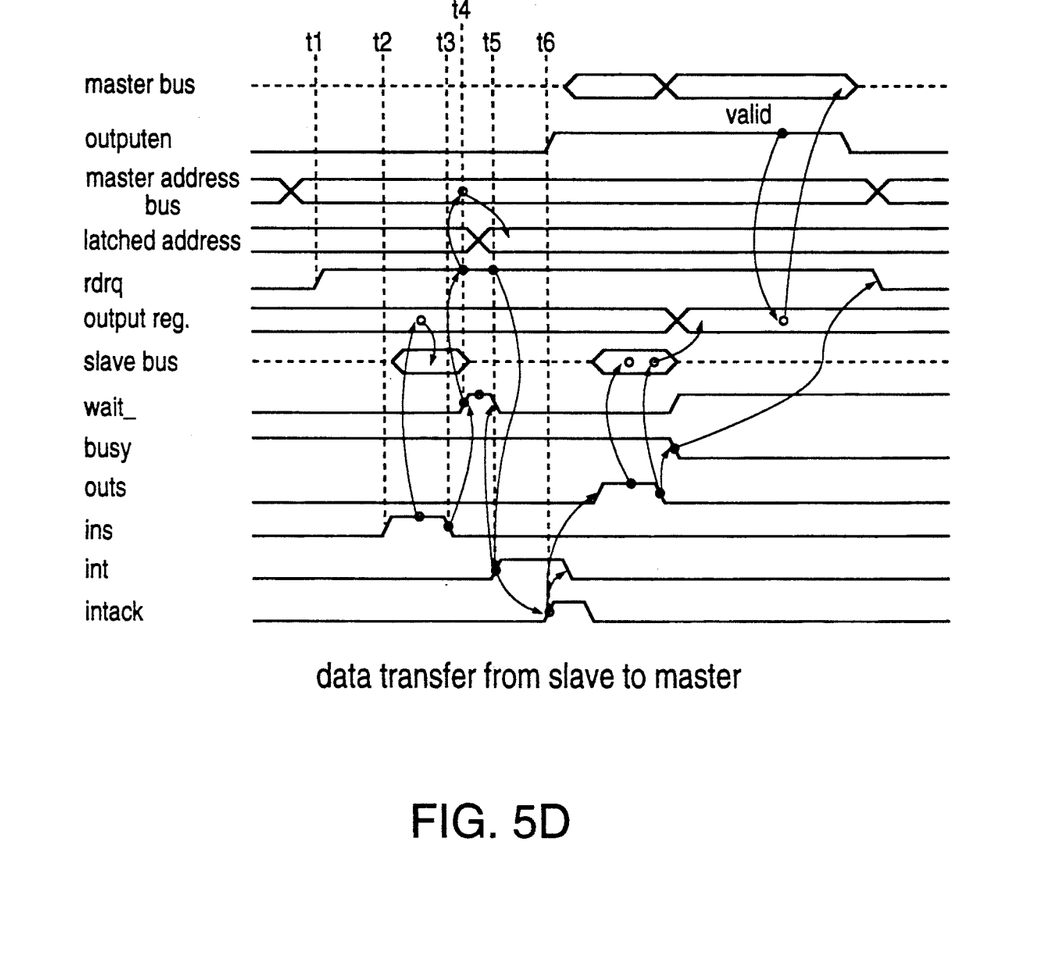

FIG. 5d shows the control signals of a "read" bus transaction, in which the master processor raise the RD signal at time t1, when the "busy" signal is at logic high. This condition, as explained above, occurs when slave processor has yet to complete service of a previous write request. At time t1 when the RD signal is raised, the master processor places an address on master address bus 307. The RD signal is propagated by AND gate 313 as the "rdrq" signal, as previously described. The rising edge transition of the "rdrq" signal is blocked temporarily by the AND gate 317 and not detected by edge detector 324d, until after the "nowait" signal is brought to logic high by the slave processor on lead 332 to signal completion of the previous write request. As shown in FIG. 5d, the slave processor receives the data to be written in the pending write request by bringing to logic high the "ins" signal on lead 331 at time t2, and completes the write operation at time t3, when it brings the "ins" signal back to logic low. The falling edge at time t3 of the "ins" signal on lead 331 is detected by edge detector 324b, which sets the "nowait" signal on lead 332 at time t4. By setting the "nowait" signal, the output lead of AND gate 318 provides the delayed rising edge of the "rdrq" signal, which is detected by edge detector 324d to set at time t5 the "int" signal on lead 329 to indicate to the slave processor the pending read request. The "busy" signal on lead 306 is not reset at this time, since the current read request is still pending. The rising edge of the "rdrq" signal is also propagated through OR gate 316 to strobe the address on master address bus 307 into address latch 309, which is provided to vectored address generator 310 to generate on address bus 333 a vectored address at which the slave processor's read service routine is located.

At time t6, the slave processor acknowledges the "read" request by raising the "intack" signal on lead 326, and jumping to the vectored address on vectored address bus 333. The signal protocol subsequent to time t6 for the remainder of this "read" request transaction of FIG. 5d is identical to the signal protocol subsequent to time t2 of FIG. 5c, and thus is not repeated.

Figure 4A:
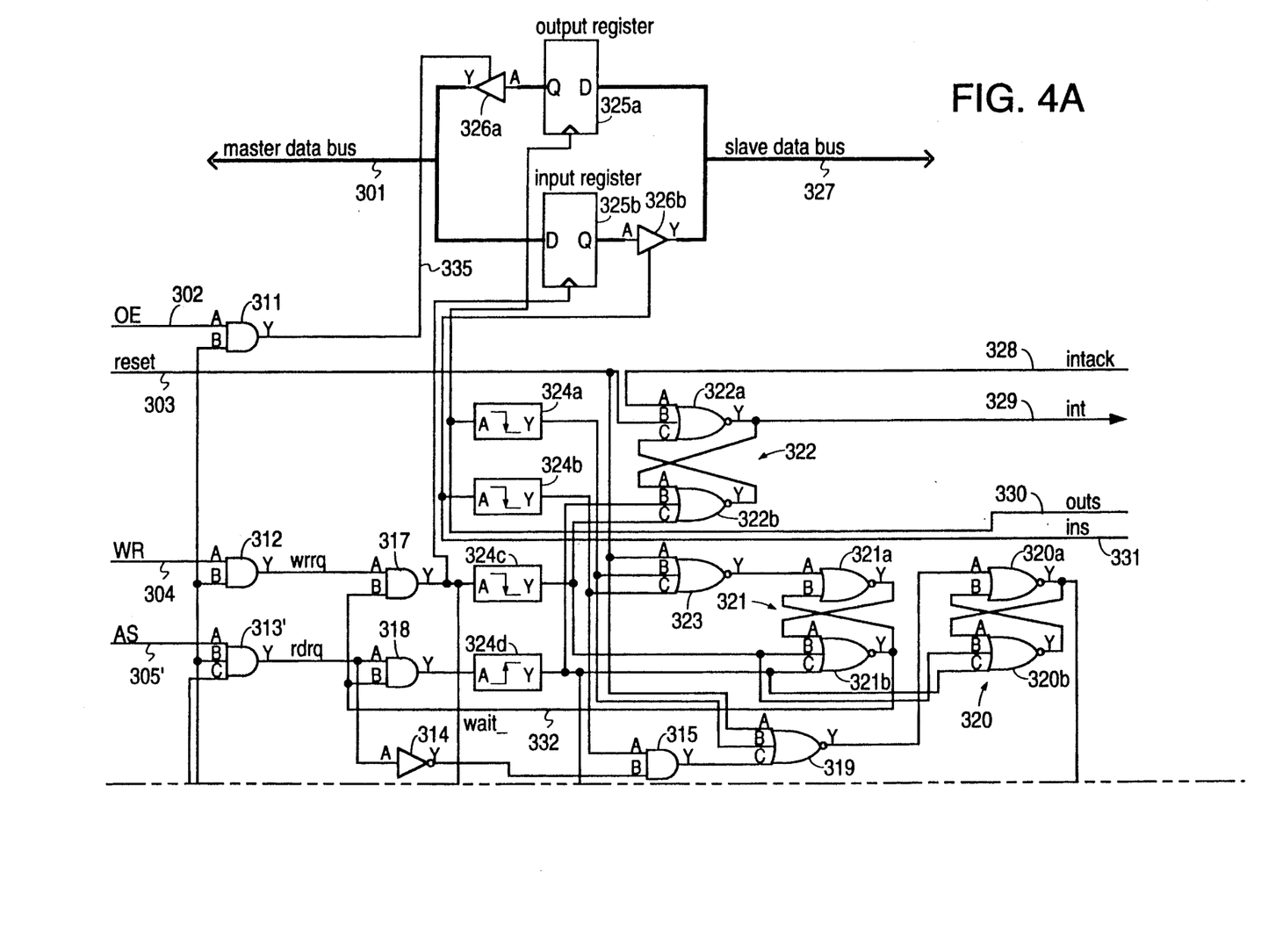
FIGS. 4A and 4B show a second embodiment of a bus interface unit in accordance with the present invention.
Figure 4B:
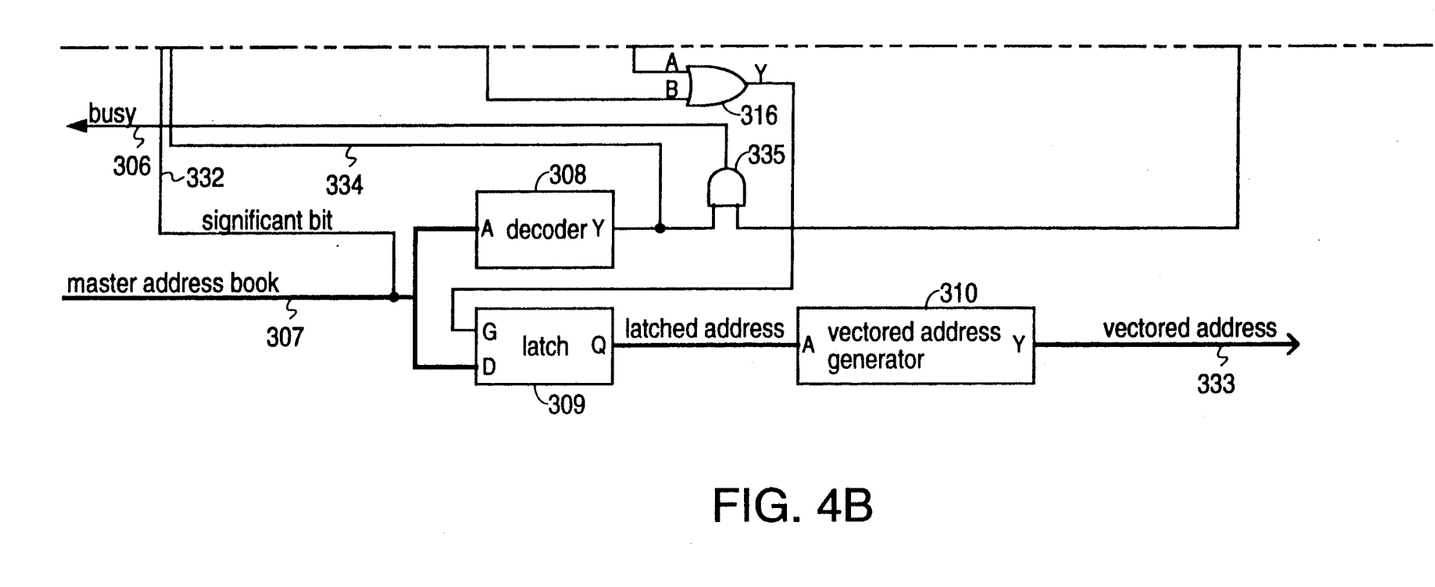

FIG. 4 shows a second embodiment of the present invention, in which the RD signal on lead 305 of FIG. 3 is replaced by the AND product of an address strobe signal AS on lead 305' and the most significant bit 332 of the master address bus 307. The address strobe signal is provided when the address on master address bus 307 is stable. As a result, the "rdrq" signal of FIG. 4 is provided by a three-input AND gate 313', rather than the two-input AND gate 313. In order to request a "read" operation, both the significant bit of master address bus 307 and the AS signal must be held high during the period in which the "read" request is pending. All other elements of the embodiment shown in FIG. 4 are identical to corresponding elements of the embodiment shown in FIG. 3. To facilitate comparison between the embodiments of FIGS. 3 and 4, identical elements on each diagram are given identical reference numerals.

The timing and transitions of the control signals for the embodiment shown in FIG. 4 are identical to those for the embodiment shown in FIG. 3, and so the descriptions provided above in conjunction with each of FIGS. 5a–5d are equally applicable to the embodiment shown in FIG. 4.

The above description and the accompanying figures are intended to be illustrative of the specific embodiments and not limiting the present invention. Many modifications and variations are possible within the scope of the present invention, as defined by the following claims.

I claim:

1. A structure for interfacing a master processor to a slave processor comprising:

means for receiving a write request signal from said master processor;

means for receiving from said master processor data associated with said write request signal;

means coupled to said write request signal receiving means, for providing an interrupt signal to said slave processor in response to said write request signal;

means, coupled to said write request signal receiving means, for providing a slave processor busy signal to said master processor upon receiving said write request signal;

means for receiving an interrupt acknowledge signal from said slave processor;

means, coupled to said means for providing an interrupt signal and said means for receiving an interrupt acknowledge signal, for inactivating said interrupt signal upon receiving said interrupt acknowledge signal;

means for receiving from said slave processor an input strobe signal;

means, coupled to said means for receiving data and said means for receiving an input strobe signal, for transferring said data to said slave processor upon receiving said input strobe signal from said slave processor; and means, coupled to said means for transferring data and said means for providing a slave processor busy signal, for inactivating said slave processor busy signal after said transferring of data to said slave processor is complete.

2. A structure as in claim 1, further comprising a register for receiving from said master processor an address associated with said write request signal identified with the slave processor.

3. A structure as in claim 2, further comprising means coupled to said register, for translating said address received in said register to an address used internally by said slave processor.

4. A structure as in claim 1, wherein said means for providing an interrupt signal comprises means for delaying said interrupt signal when said write request signal is received prior to a busy signal, responding to a previous write request signal, is inactivated by said means for inactivating a slave processor busy signal.

5. A structure for interfacing a master processor to a slave processor comprising:

means for receiving a read request signal from said master processor;

means for providing an interrupt signal to said slave processor upon receiving said read request signal;

means, coupled to said means for receiving said read request signal, for providing a slave processor busy signal to said master processor upon receiving said read request signal;

means for receiving from said slave processor an interrupt acknowledge signal;

means, coupled to said means for providing an interrupt signal and said means for receiving said interrupt acknowledge signal, for inactivating said interrupt signal upon receiving said interrupt acknowledge signal;

means for receiving an output strobe signal from said slave processor;

means for receiving data associated with said output strobe signal from said slave processor;

means, coupled to said means for receiving data and said means for receiving an output strobe signal, for transferring said data received from said slave processor to said master processor, upon receiving said output strobe signal; and means, coupled to said means for transferring said data and said means for providing said slave processor busy signal, for inactivating said slave processor busy signal after said data are transferred to said master processor.

6. A structure as in claim 5, wherein said means for transferring said data receives an output enable signal from said master processor to enable said data transferring.

7. A structure as in claim 5, wherein said structure is capable of performing a write operation and said structure further comprising within said means for providing an interrupt signal means for delaying said interrupt signal when said read request signal is received prior to completion of said write operation.

8. A method for interfacing a master processor to a slave processor comprising the steps of:
   receiving a write request signal from said master processor;
   receiving from said master processor data associated with said write request signal;
   providing an interrupt signal to said slave processor in response to said write request signal;
   providing a slave processor busy signal to said master processor upon receiving said write request signal;
   receiving an interrupt acknowledge signal from said slave processor;
   inactivating said interrupt signal upon receiving said interrupt acknowledge signal;
   receiving from said slave processor an input signal;
   transferring said data to said slave processor upon receiving said input signal from said slave processor; and
   inactivating said busy signal after said transferring of data to said slave processor is complete.

9. A method as in claim 8, further comprising the step of receiving from said master processor an address identified with the slave processor.

10. A method as in claim 9, further comprising the step of translating said address from said master processor to an address used internally by said slave processor.

11. A method as in claim 8, wherein said step of providing an interrupt signal comprises the step of delaying said interrupt signal when said write request signal is received prior to a busy signal, which corresponds to a previous write request, is inactivated.

12. A method for interfacing a master processor to a slave processor comprising the steps of:
   receiving a read request signal from said master processor;
   providing an interrupt signal to said slave processor upon receiving said read request signal;
   providing a slave processor busy signal to said master processor upon receiving said read request;
   receiving from said slave processor an interrupt acknowledge signal;
   inactivating said interrupt signal upon receiving said interrupt acknowledge signal;
   receiving an output signal from said slave processor;
   receiving data associated with said output signal from said slave processor;
   transferring said data received from said slave processor to said master processor, upon receiving said output signal; and
   inactivating said busy signal after said data are transferred to said master processor.

13. A method as in claim 12, wherein said step of transferring said data to said master processor comprises the step of receiving an output enable signal from said master processor.

14. A method as in claim 12, said method further comprising the step of delaying said interrupt signal when said read request signal is received before a busy signal corresponding to a previous write operation is canceled.

* * * * *